United States Patent
Stretch et al.

(10) Patent No.: US 6,561,141 B2
(45) Date of Patent: May 13, 2003

(54) WATER-COOLED MAGNETORHEOLOGICAL FLUID CONTROLLED COMBINATION FAN DRIVE AND WATER PUMP

(75) Inventors: Dale A. Stretch, Novi, MI (US); Wade A. Smith, Mayville, MI (US); David Turner, Bloomfield Hills, MI (US); Thomas A. Gee, Allen Park, MI (US)

(73) Assignee: Borg Warner, Inc., Auburn Hills, MI (US)

( * ) Notice: Subject to any disclaimer, the term of this patent is extended or adjusted under 35 U.S.C. 154(b) by 0 days.

(21) Appl. No.: 09/766,452

(22) Filed: Jan. 19, 2001

(65) Prior Publication Data
US 2002/0096132 A1 Jul. 25, 2002

(51) Int. Cl.[7] .................................................. F01P 7/02
(52) U.S. Cl. .............................. 123/41.12; 123/41.44; 123/41.49
(58) Field of Search ...................... 188/267.2, 267.1, 188/161, 164; 417/53, 48, 50, 205, 212, 199.1, 319; 192/21.5, 58.4, 58.41, 58.5, 58.6, 82, 84.3; 418/69; 123/41.4, 41.41, 41.49, 41.44, 41.12

(56) References Cited

U.S. PATENT DOCUMENTS

| | | |
|---|---|---|
| 2,838,244 A | 6/1958 | Oldberg |
| 4,066,048 A | 1/1978 | Premus |
| 4,073,370 A | 2/1978 | Tinholt |
| 4,180,024 A | 12/1979 | Hernandez |
| 4,557,223 A | 12/1985 | N Gueyen |
| 4,630,721 A | 12/1986 | Johnston et al. |
| 4,692,053 A | 9/1987 | Sampedro |
| 4,741,421 A | 5/1988 | Johnston |
| 4,836,147 A | 6/1989 | Morris |
| 4,920,929 A * | 5/1990 | Bishop ..................... 123/41.49 |
| 5,275,538 A | 1/1994 | Paliwoda et al. |
| 5,896,965 A * | 4/1999 | Gopalswamy ............. 192/21.5 |
| 6,021,747 A | 2/2000 | Gee et al. |

FOREIGN PATENT DOCUMENTS

| | | |
|---|---|---|
| EP | 0 317 186 B1 | 7/1992 |
| EP | 0 936 371 A1 | 8/1999 |
| EP | 0 882 904 B1 | 4/2001 |
| FR | 2 781 267 | 1/2000 |

* cited by examiner

Primary Examiner—Noah P. Kamen
(74) Attorney, Agent, or Firm—Artz & Artz, P.C.; Greg Dziegielewski

(57) ABSTRACT

A water-cooled magnetorheological fluid controlled combination fan drive and water pump (60) used in a cooling system. Introducing a magnetic field within a working chamber (91) between a drive ring (74) and a driven ring (84) increases the viscosity of a magnetorheological fluid by changing the state of the magnetorheological fluid from a free flowing liquid to a semi-solid state. The shear rate of the magnetorheological fluid in an activated state creates additional torque to drive an output shaft (108), and coupled fan (110), at a higher rotational speed to cool the engine coolant flowing through a closely coupled radiator. The rotation of the drive ring (74) also rotates an attached impeller assembly (112) having impellers (114) to move engine coolant through the cooling system. The magnetic field is induced by directing a flow of electrical current through an electronic coil (62) coupled within the water-cooled magnetorheological fluid controlled combination fan drive and water pump (60), and an electronic control unit coupled to the electronic coil (62) controls the amount of electrical current flowing through the coil (62). This maintains the temperature of the engine block within an acceptable temperature range at a particular engine speed.

19 Claims, 3 Drawing Sheets

WATER-COOLED MAGNETORHEOLOGICAL FLUID CONTROLLED COMBINATION FAN DRIVE AND WATER PUMP

TECHNICAL FIELD

The invention relates generally to cooling systems and more specifically to a water-cooled magnetorheological fluid controlled combination fan drive and water pump.

BACKGROUND ART

Cooling systems are used on vehicles today to provide cooling to an engine during operation. Fan drives are typically driven by the engine crankshaft at a fixed ratio to cool engine coolant as it flows through a radiator. Thus, as the engine speed is reduced, as is the trend in vehicles today to reduce emissions, the fan drive speed is correspondingly reduced. Similarly, as the engine speed increases, the fan drive speed correspondingly increases. This increased fan drive speed causes the engine block temperature to cool to less than optimal levels, resulting in less than optimal conditions that can affect emissions and fuel economy.

One method to address these issues is to add a viscous fluid coupling to drive the radiator cooling fans. In a typical viscous fluid coupling, an input shaft drives an input coupling member (clutch) which is received within an output coupling member, and torque is transmitted from the input to the output, in the presence of viscous fluid, by means of viscous shear drag. The coupling normally includes some sort of valving which controls the amount of viscous fluid within a viscous shear chamber, thereby controlling the ratio of the output torque and speed to the input torque and speed. Typically, this valving comprises a valve member that is moveable to cover or uncover a fill port disposed between a reservoir and viscous shear chamber (operating chamber).

As is well known to those skilled in the art, the transmission of torque from an input coupling member to an output coupling member by means of viscous shear drag results in the generation of a substantial amount of heat. At least a major portion of the heat must be dissipated, or else the temperature of the viscous fluid will continue to increase, as the fan drive operates, until the fluid eventually begins to chemically break down and lose viscosity, resulting in less torque available to drive the fan drive.

To remedy this, viscous couplings have been developed with increased heat dissipation capabilities. For example, U.S. Pat. No. 6,021,747 discloses a viscous coupling that can be water-cooled, or cooled by the flow of engine coolant (the terms "water" and "coolant" are used interchangeably). This minimizes the buildup of heat within the coupling, thereby preventing the chemical breakdown of the viscous fluid within the coupling.

One problem with currently available viscous couplings for fan drives is the complexity of the designs. Viscous fluid must be moved from a fluid reservoir chamber to a working chamber in order to couple or uncouple the input coupling member from the output coupling member. This requires a combination of the use of moveable valve members, valve wiper arms, and relief chambers to move the viscous fluid both into and out of the working chamber. This adds complexity and cost to the viscous coupling.

More importantly, currently available viscous couplings are either incapable of being controlled to provide instantaneous cooling to an engine block or require a period of time to increase or decrease the amount of cooling available to the engine block. This time lag may adversely affect fuel economy and emissions at various engine speeds and engine temperatures.

In addition to fan drives, cooling systems generally have a water pump for pumping cooled engine coolant from a radiator to an engine block in a closed system. These water pumps are either electric water pumps or water pumps controlled by drive mechanisms similar to those found on fan drives as described above. Similarly, these driven water pumps experience the same sort of problems of instantaneous control as the fan drives. Further, these water pumps add another degree of complexity to the cooling system that significantly increase the cost and space necessary to house the various associated components.

It is thus highly desirable to limit the complexity of the cooling systems by combining the fan drive mechanism and water pump into one element. It is also desirable to electronically control the fan speed and pumping capacity of the combined element to provide instantaneously control of the cooling capacity of the cooling system.

SUMMARY OF THE INVENTION

The above and other objects of the invention are met by the present invention that is an improvement over known cooling systems.

The present invention discloses a water-cooled magnetorheological fluid controlled combination fan drive and water pump. Magnetorheological fluid, normally thin, thickens between a pair of cylindrical drums when a magnetic field is applied. This thickening allows the magnetorheological fluid to shear between the drums and transmits torque from a driven ring to a drive ring. The driven ring is coupled to an impeller assembly that rotates to provide engine coolant flow to the engine. Further, the drive ring is coupled to an output shaft that is coupled to a fan tat rotates to provide cooling air flow to a closely coupled radiator. A stationary coil mounted within the water-cooled magnetorheological fluid controlled combination fan drive and water pump is electrically excited to create the desired magnetic field. The amount of electrical excitation is controlled as a function of engine speed and engine block temperature to maximum fuel economy and minimize emissions at various engine temperatures and speeds.

Other features, benefits and advantages of the present invention will become apparent from the following description of the invention, when viewed in accordance with the attached drawings and appended claims.

BEST MODE(S) FOR CARRYING OUT THE INVENTION

Figure 1:
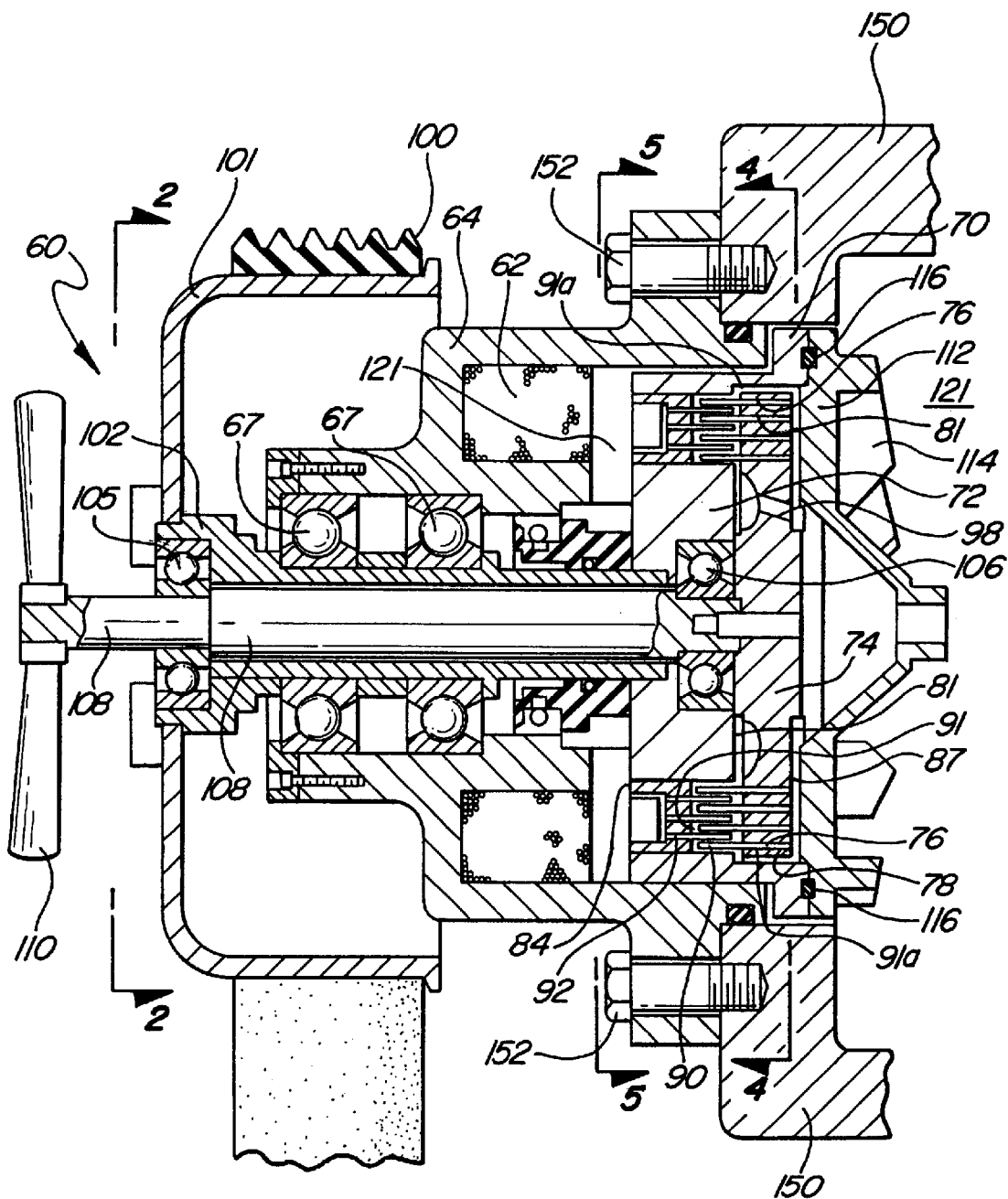
FIG. 1 is a perspective view of a water-cooled magnetorheological fluid controlled combination fan drive and water pump according to one preferred embodiment of the present invention.
Figure 2:
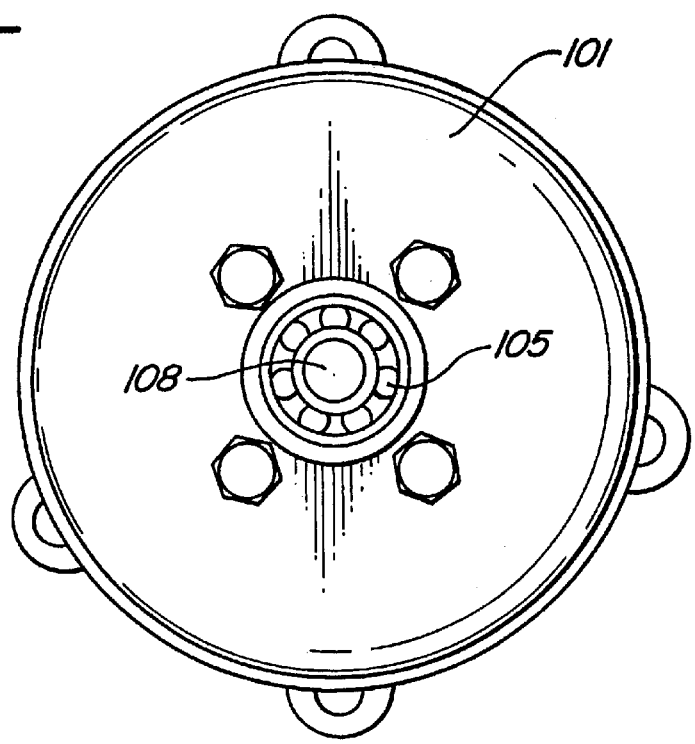
FIG. 2 is a cross-sectional view of FIG. 1, the cross-section being taken along line 2—2 in FIG. 1.

Referring now to FIG. 1, a water-cooled magnetorheological fluid controlled combination fan drive and water pump, hereinafter referred to as assembly 60, is depicted. A drive belt 100 coupled to an engine crankshaft (not shown) via a crankshaft pulley (not shown) is coupled to a non-magnetic housing cover 101 of the assembly 60. As shown in FIGS. 1 and 2, the cover 101 is coupled to an external shaft 102, which is coupled to a lower steel ring 72. The lower steel ring 72 is closely coupled to a steel support housing 64 and is rotatably mounted on an output shaft 108 by bearings 105, 106.

Figure 3:
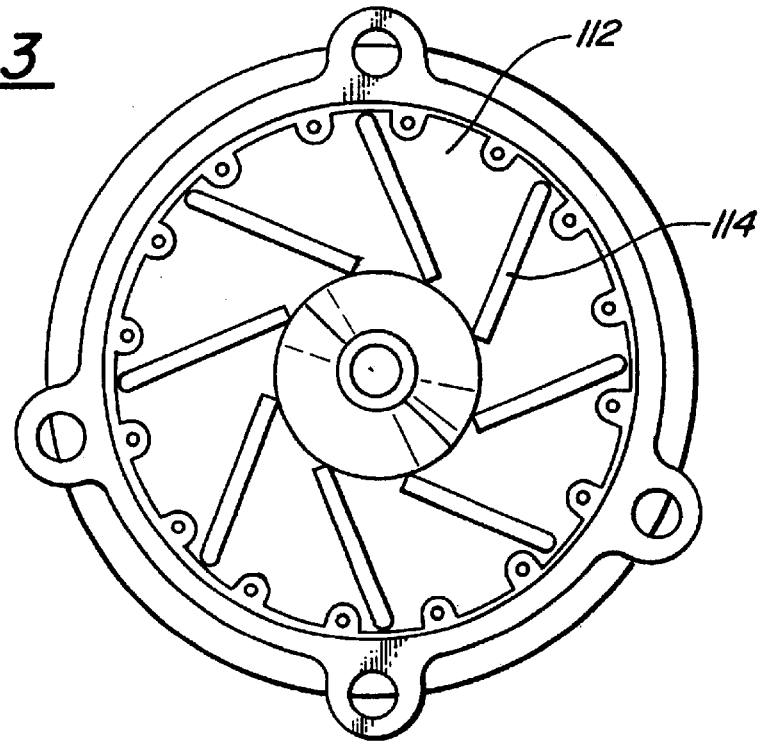
FIG. 3 is a right side view of FIG. 1.
Figure 4:
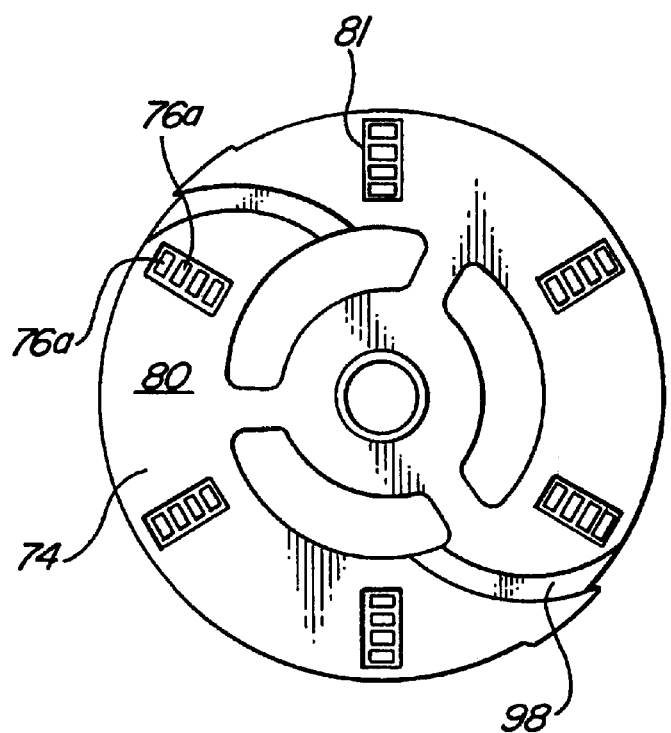
FIG. 4 is a cross-sectional view of FIG. 1, the cross-section being taken along line 4—4 in FIG. 1.

The steel support housing 64 is used to carry magnetic flux from an upper steel ring 70 to a lower steel ring 72. As seen in FIGS. 1 and 4, a drive ring 74 has four partial concentric drive hoops 76 that are pressed into grooves 78 on its outer side 80. These hoops 76 are bent over tabs 76a within pockets 81 on the outer side 80 for retention. The drive ring 74 is coupled with an output shaft 108 that is coupled to a fan 110 for cooling engine coolant within a radiator (not shown). Referring to FIG. 3, an impeller assembly 112 having a plurality of impellers 114 is affixed to the upper steel ring 70 and sealed with a seal 116. A reservoir 87 is defined between the impeller assembly 112, the seal 116, and drive ring 74. The seal 116 also ensures that engine coolant contained in the engine coolant chamber 121 does not enter the reservoir 87.

Figure 5:
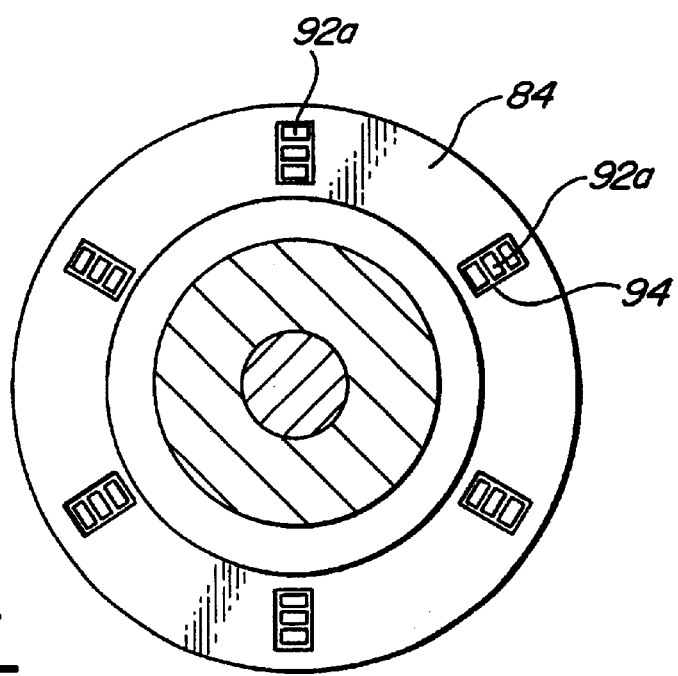
FIG. 5 is a cross-sectional view of FIG. 1, the cross-section being taken along line 5—5 in FIG. 1.

A driven non-magnetic ring 84 is pressed into the upper steel ring 70 and lower steel ring 72 with the steel rolled over to maintain the ring 84 in place. Collectively, the driven non-magnetic ring 84, the external shaft 102, the upper steel ring 70, the lower steel ring 72, the impeller assembly 112, and the non-magnetic housing cover 101 may be referred to as an input member. As seen in FIGS. 1 and 5, the driven non-magnetic ring 84 houses three partial concentric driven hoops 90, or driven concentric hoops, pressed into cur grooves 92 that are bent over tabs 92a in pockets 94 for retention. An epoxy sealer (not shown) is preferably applied over the driven non-magnetic rings 84 to prevent leakage of fluid between the working chamber 91 and the engine coolant chamber 121.

A magnetorheological ("MR") fluid is pumped from collection area 91a to a reservoir 87 through a pump 98 located on the drive ring 74 and into a working chamber 91 between the drive ring 74 and driven ring 84 by rotational forces exerted on the driven ring 84. The MR fluid then returns to collection area 91a in a closed loop by centrifugal force.

The MR fluid is a controllable fluid medium that changes from a free flowing liquid to a semi-solid state when a magnetic field is applied by aligning magnetically polarized particles contained within the MR fluid to form particle chains. This effectively increases the viscosity of the MR fluid. When the magnetic field is removed, the MR fluid returns to its original liquid state. Advantageously, the response time for MR fluid to change between a steady-state semi-solid phase to a steady-state fluid (liquid) phase is in the range of a millisecond.

Disposed within the housing 64 of the magnetorheological assembly 60 is an electromagnetic coil 62 having a pair of electrical leads (not shown) extending radially through an opening in the steel support housing 64. Preferably, the steel support housing 64 is attached to the engine block 150 using a bolt 152, however other types of attachment methods are contemplated. The external shaft 102 is supported by a bearing 67 to steel support housing 64. It will be understood by those skilled in the art, that although the presence of the electromagnetic coil 62 is an important aspect of the controls, and that the controls are significant to the overall invention, the details of the electromagnetic coil 62 are not essential, it is believed to be within the ability of those skilled in the art to select an appropriate coil assembly, based upon a reading and understanding of this specification.

In an unactivated state, wherein electrical current is not flowing through the coil 62 to create a magnetic field, the thin MR fluid is sheared at a very low shear rate in the working chamber 91. This shearing action is created due to the rotation of the drive belt 100 in response to the speed of the engine, which rotates the input member and the driven ring 84, thereby creating torque to drive the drive ring 74 and the coupled fan 110. The steel support housing 64, the coil 62, and the engine block 150 remain stationary despite the rotation of the drive belt 100. Because the MR fluid is thin, little torque is created. The result is that the fan 110 rotates very slowly as a function of the viscosity of the MR fluid and the rotational speed of the input source. Thus, very little cooling is provided to the engine coolant contained within the radiator.

When the coil 62 is activated with electrical current from an electronic control unit (not shown), a magnetic field is created wherein the flux proceeds through the upper steel ring 70, the lower steel ring 72, and through the concentric hoops 76, 90 overlying the working chamber 91 to complete the circuit. This causes the MR fluid flowing through the working chamber 91 to line up within the working chamber 91 and increase in viscosity as described above, thereby creating extra shear within the working chamber 91 between the drive ring 74 and driven ring 84 that causes the drive ring 74 to increase in rotation in response to the extra shear. This causes the fan 110 coupled to the drive ring 74 by the output shaft 108 to rotate more quickly. This provides extra airflow to cool engine coolant flowing through the radiator. The electronic control unit supplies electrical current to the coil 62 as a function of engine speed and engine block temperature while taking into account the characteristics of the MR fluid in an activated state.

The shearing of the MR fluid within the working chamber 91 generates heat within the assembly 60. However, engine coolant contained in the engine coolant chamber 121 is used to dissipate this excess heat to maintain the temperature within the working chamber 91 at a desirable temperature less than the temperature at which the MR fluid may degrade. This helps to prolong the life of the assembly 60.

The assembly 60 of the present invention offers many advantages over the prior art. First, by combining the water pump and fan drive into a single simplified assembly 60, savings are realized in terms of cost, space and weight. Second, the assembly 60 operates at a lower operating temperature than its non water-cooled alternatives. Third, the present invention offers more precise control over the cooling capabilities of the cooling system, as the MR fluid is changed back and forth from a free flowing liquid to a semi-solid state In a few milliseconds by activating or inactivating the coil 62. This maintains the engine block temperature within an ideal temperature range, thereby increasing fuel economy and decreasing emissions at virtually any engine speed. Fourth, by coupling the assembly 60 with the engine coolant chamber 121, the heat generated due to the shearing of the MR fluid is dissipated, thereby prolonging the life of the assembly 60.

While the best modes for carrying out the present invention have been described in detail herein, those familiar with the art to which this invention relates will recognize various alternate designs and embodiments for practicing the invention as defined by the following claims. All of these embodiments and variations that come within the scope and meaning of the present claims are included within the scope of the present invention.

What is claimed is:

1. A water-cooled magnetorheological fluid controlled combination fan drive and water pump (60) comprising:
   an input member coupled to a drive belt (100);
   a support housing (64) closely coupled to said input member having a coil (62); within said working chamber (91) when said drive ring (74) is rotating.

2. The water-cooled magnetorheological fluid controlled combination fan drive and water pump (60) of claim 1, wherein said input member comprises a non-magnetic housing cover, an external shaft (102), an upper steel ring (70), a lower steel ring (72), and a non-magnetic housing cover (101).

3. The water-cooled magnetorheological fluid controlled combination fan drive and water pump (60) of claim 1 further comprising:
   a fluid reservoir (87) defined between said drive ring (74) and said impeller assembly (112), said fluid reservoir in fluid communication with said working chamber (91); and
   a pump (98) located on said drive ring (74), wherein the rotation of said drive ring (74) causes said quantity of magnetorheological fluid to be pumped from said fluid reservoir (87) to said working chamber (91) by said pump.

4. The water-cooled magnetorheological fluid controlled combination fan drive and water pump (60) of claim 1, wherein the amount of rotational movement of said drive ring (74) is a function of the of the rotational speed of said drive belt (100), the composition of said quantity of magnetorheological fluid, and a viscosity of said portion of magnetorheological fluid being sheared within said working chamber (91).

5. A. The water-cooled magnetorheological fluid controlled combination fan drive and water pump (60) of claim 4, wherein the viscosity of said portion of magnetorheological fluid is a function of the amount of magnetic field within said working chamber (91).

6. The water-cooled magnetorheological fluid controlled combination fan drive and water pump (60) of claim 5, wherein the viscosity of said portion of magnetorheological fluid within said working chamber (91) is a function of the amount of electrical current supplied to said coil (62) by said electronic control unit.

7. The water-cooled magnetorheological fluid controlled combination fan drive and water pump (60) of claim 1 further comprising a plurality of impellers (114) coupled to said impeller assembly (112).

8. A method for cooling an engine, the method comprising the steps of:
   operatively coupling a water-cooled magnetorheological fluid controlled combination fan drive and water pump (60) to the engine, said water-cooled magnetorheological fluid controlled combination fan drive and water pump (60) having an input member coupled to a drive belt (100); a support housing (64) closely coupled to said input member having a coil (62); a driven ring (84) coupled to said input member; a plurality of driven ring partial concentric hoops (90) coupled to said driven ring (84) by pressing each of said a plurality of driven ring partial concentric hoops (90) into a cur groove (92) and bending each of said plurality of driven ring partial concentric hoops (90) over a driven ring tab (92a) contained in a pocket (94) on said driven ring (84); an output shaft (108) rotatably mounted within said input member, said output shaft having a fan (110); a drive ring (74) coupled to said output shaft; a plurality of drive ring partial concentric hoops (76) coupled to said drive ring (74) by pressing each of said plurality of drive ring partial concentric hoops (76) into a groove (78) and bending each of said plurality of drive ring partial concentric hoops (76) over a drive ring tab (76a) contained in a drive ring pocket (87) on an outer side (80) of said drive ring (74); an impeller assembly (112) coupled to
   an electronic control unit coupled to said coil (62) for controlling an amount of electrical current flowing through said coil;
   a driven ring (84) coupled to said input member;
   a plurality of driven ring partial concentric hoops (90) coupled to said driven ring (84) by pressing each of said a plurality of driven ring partial concentric hoops (90) into a cur groove (92) and bending each of said plurality of driven ring partial concentric hoops (90) ova a driven ring tab (92a) contained in a pocket (94) on said driven ring (84);
   an output shaft (108) rotatably mounted within said input member, said output shaft having a fan (110);
   a drive ring (74) coupled to said output shaft;
   a plurality of drive ring partial concentric hoops (76) coupled to said drive ring (74) by pressing each of said plurality of drive ring partial concentric hoops (76) into a groove (78) and bending each of said plurality of drive ring partial concentric hoops (76) over a drive ring tab (76a) contained in a drive ring pocket (87) on an outer side (80) of said drive ring (74);
   an impeller assembly (112) coupled to said driven ring (84) used to pump an engine coolant from an engine coolant chamber (121) to an engine;
   a working chamber (91) located between said drive ring (74) and said driven ring (84); and
   a quantity of magnetorheological fluid within said working chamber (91), wherein said drive ring (74) is driven by a shearing of said quantity of magnetorheological fluid said driven ring (84); a working chamber (91) located between said chive ring (74) and said driven ring (84); and a quantity of magnetorheological fluid within said working chamber (91);
   coupling an electronic control unit to said electronic coil (62) of said water-cooled magnetorheological fluid controlled combination fan drive and water pump (60); and
   activating said electronic coil (62) to increase the rotational speed of said fan (110).

9. The method of claim 8, wherein the step of operatively coupling a water-cooled magnetorheological fluid controlled combination fan drive and water pump (60) to the engine comprises the step of coupling the engine to an input member of said water-cooled magnetorheological fluid controlled combination fan drive and water pump (60) via a drive belt (100), wherein said drive belt (100) is capable of rotating in response to engine speed, thereby rotating said input member.

10. The method of claim 8, wherein the step of activating said electronic coil (62) to increase the rotational speed of said fan (110) and the rotational speed of said impeller assembly (112) comprises the steps of:
   determining a current engine operating speed and a current engine block temperature;

transmitting said current operating speed and said current engine block temperature to said electronic control unit;

determining an amount of electrical current to introduce to said electronic coil (62) as a function of said current engine operating speed and said current engine block temperature to achieve a desired rotational speed of said fan (110) and said impeller assembly (112);

directing the introduction of said amount of electrical current to said electronic coil (62) from said electronic control unit to achieve said desired rotational speed.

11. The method of claim 10, wherein the step of determining an amount of current to introduce to said electronic coil (62) comprises the step of determining an amount of current to introduce to said electronic coil (62) as a function of said current engine operating speed, said current engine block temperature, the size of said working chamber (91), the flow rate of said quantity of magnetorheological fluid through said working chamber (91), and the composition of said quantity of magnetorheological fluid to achieve a desired rotational speed of said fan (110) and said impeller assembly (112).

12. The method of claim 10, wherein the step of directing the introduction of said amount of electrical current through said electrical coil (62) comprises the step of directing the introduction of said amount of electrical current though said electronic coil (62) to create a magnetic field within a working chamber (91) of said water-cooled magnetorheological fluid controlled combination fan drive and water pump (60), wherein said magnetic field changes said quantity of magnetorheological fluid flowing though said working chamber (91) from a free flowing liquid to a semi-solid state magnetorheological fluid, wherein said semi-solid state magnetorheological fluid has a higher viscosity than said free flowing liquid, said higher viscosity thereby creating additional torque to rotate a drive ring (74) closely coupled with a driven ring (84) within said working chamber (91), thereby increasing the rotation of said fan (110) and said impeller assembly (112) coupled with said drive ring (74).

13. A method of controlling engine temperature, the method comprising the steps of:

operatively coupling a water-cooled magnetorheological fluid controlled combination fan drive and water pump (60) to the engine said water-cooled magnetorheological fluid controlled combination fan drive and water pump (60) having an input member coupled to a drive belt (100); a support housing (64) closely coupled to said input member having a coil (62); a driven ring (84) coupled to said input member; a plurality of driven ring partial concentric hoops (90) coupled to said driven ring (84) by pressing each of said a plurality of driven ring partial concentric hoops (90) into a cur groove (92) and bending each of said plurality of driven ring partial concentric hoops (90) over a driven ring tab (92a) contained in a pocket (94) on said driven ring (84); an output shaft (108) rotatably mounted within said input member, said output shaft having a fan (110); a drive ring (74) coupled to said output shaft; a plurality of drive ring partial concentric hoops (76) coupled to said drive ring (74) by pressing each of said plurality of drive ring partial concentric hoops (76) into a groove (78) and bending each of said plurality of drive ring partial concentric hoops (76) over a drive ring tab (76a) contained in a drive ring pocket (87) on an outer side (80) of said drive ring (74); an impeller assembly (112) coupled to said driven ring (84); a working chamber (91) located between said drive ring (74) and said driven ring (84); and a quantity of magnetorheological fluid within said working chamber (91); and increasing the viscosity of a quantity of magnetorheological fluid flowing through a working chamber (91) of said water-cooled magnetorheological fluid controlled combination fan drive and water pump (60), thereby increasing the torque to drive a drive ring (74) of said water-cooled magnetorheological fluid controlled combination fan drive and water pump (60), said drive ring (74) being coupled to a fan (110), thereby increasing the rotational speed of said fan (110).

14. The method of claim 13, wherein the step of increasing the viscosity of said quantity of magnetorheological fluid contained within said working chamber (91) comprises the step of increasing the viscosity of said quantity of magnetorheological fluid by changing said quantity of magnetorheological fluid flowing through said working chamber (91) from a free flowing liquid to a semi-solid state.

15. The method of claim 14, wherein the step of increasing the viscosity of said quantity of magnetorheological fluid by changing said quantity of magnetorheological fluid flowing through said working chamber (91) from a free flowing liquid to a semi-solid state comprises the step of introducing a magnetic field having a first strength through said working chamber (91).

16. The method of claim 15, wherein the step of introducing a magnetic field having a first strength through said working chamber (91) comprises the step of introducing a magnetic field having a first strength through said working chamber (91), said first strength being a function of engine speed, engine block temperature, and the composition of said quantity of magnetorheological fluid.

17. The method of claim 15, wherein the step of introducing a magnetic field having a first strength through said working chamber (91) comprises the step of directing a flow of a first quantity of electrical current through an electrical coil (62) coupled within said magnetorheological water-cooled combination fan drive and water pump (60), wherein said first quantity of electrical current induces a magnetic field having a first strength through said working chamber (91).

18. The method of claim 17, wherein the step of directing a flow of a first quantity of electrical current through an electrical coil (62) comprises the step of directing a flow of a first quantity of electrical current through an electrical coil (62) coupled within said water-cooled magnetorheological fluid controlled combination fan drive and water pump (60), wherein said first quantity of electrical current induces a magnetic field having a first strength through said working chamber (91), wherein said first quantity of electrical current is a function of engine speed, engine block temperature, and the composition of said quantity of magnetorheological fluid.

19. The method of claim 17, wherein the step of directing a flow of a first quantity of electrical current through an electrical coil (62) comprises the steps of:

coupling an electronic control unit to said electronic coil (62), said electronic control unit capable of directing a flow of a quantity of electrical current to said electrical coil (62) to maintain an engine block temperature within an predetermined acceptable range at various engine speeds; and directing a flow of a first quantity of electrical current from said electronic control unit though said electrical coil (62) coupled within said water-cooled magnetorheological fluid controlled combination fan drive and water pump (60), wherein said first quantity of electrical current induces a magnetic field having a first strength through said working chamber (91), wherein said first quantity of electrical current is a function of the current engine speed, the current engine block temperature, and the composition of said quantity of magnetorheological fluid.

\* \* \* \* \*

UNITED STATES PATENT AND TRADEMARK OFFICE
CERTIFICATE OF CORRECTION

PATENT NO. : 6,561,141 B2  Page 1 of 2
APPLICATION NO. : 09/766452
DATED : May 13, 2003
INVENTOR(S) : Dale A. Stretch et al.

It is certified that error appears in the above-identified patent and that said Letters Patent is hereby corrected as shown below:

Column 5, line 8: "within said working chamber (91) when said drive ring (74) is rotating" should read:

-- an electronic control unit coupled to said coil (62) for controlling an amount of electrical current flowing through said coil;

a driven ring (84) coupled to said input member;

a plurality of driven ring partial concentric hoops (90) coupled to said driven ring (84) by pressing each of said a plurality of driven ring partial concentric hoops (90) into a cur groove (92) and bending each of said plurality of driven ring partial concentric hoops (90) over a driven ring tab (92a) contained in a pocket (94) on said driven ring (84);

an output shaft (108) rotatably mounted within said input member, said output shaft having a fan (110);

a drive ring (74) coupled to said output shaft;

a plurality of drive ring partial concentric hoops (76) coupled to said drive ring (74) by pressing each of said plurality of drive ring partial concentric hoops (76) into a groove (78) and bending each of said plurality of drive ring partial concentric hoops (76) over a drive ring tab (76a) contained in a drive ring pocket (87) on an outer side (80) of said drive ring (74);

an impeller assembly (112) coupled to said driven ring (84) used to pump an engine coolant from an engine coolant chamber (121) to an engine;

a working chamber (91) located between said drive ring (74) and said driven ring (84); and a quantity of magnetorheological fluid within said working chamber (91), wherein said drive ring (74) is driven by a shearing of said quantity of magnetorheological fluid within said working chamber (91) when said drive ring (74) is rotating. --

Signed and Sealed this

Seventh Day of December, 2010

David J. Kappos
*Director of the United States Patent and Trademark Office*

CERTIFICATE OF CORRECTION (continued)
U.S. Pat. No. 6,561,141 B2

Column 5, line 31: "ring (74) is a function of the of the rotation speed" should read -- ring (74) is a function of the rotational speed --

Column 5, line 36: "A. The water-cooled magnetorheological fluid" should read -- The water-cooled magnetorheological fluid --

Column 6, line 11: "coupled to" should read -- coupled to said driven ring (84); a working chamber (91) located between said drive ring (74) and said driven ring (84); and a quantity of magnetorheological fluid within said working chamber (91);

coupling an electronic control unit to said electronic coil (62) of said water-cooled magnetorheological fluid controlled combination fan drive and water pump (60); and activating said electronic coil (62) to increase the rotational speed of said fan (110). --

Column 6, line 12: "an electronic control unit coupled to said coil (62) for controlling an amount of electrical current flowing through said coil;

a driven ring (84) coupled to said input member;

a plurality of driven ring partial concentric hoops (90) coupled to said driven ring (84) by pressing each of said a plurality of driven ring partial concentric hoops (90) into a cur groove (92) and bending each of said plurality of driven ring partial concentric hoops (90) over a driven ring tab (92a) contained in a pocket (94) on said driven ring (84);

an output shaft (108) rotatably mounted within said input member, said output shaft having a fan (110); a drive ring (74) coupled to said output shaft;

a plurality of drive ring partial concentric hoops (76) coupled to said drive ring (74) by pressing each of said plurality of drive ring partial concentric hoops (76) into a groove (78) and bending each of said plurality of drive ring partial concentric hoops (76) over a drive ring tab (76a) contained in a drive ring pocket (87) on an outer side (80) of said drive ring (74);

an impeller assembly (112) coupled to said driven ring (84) used to pump an engine coolant from an engine coolant chamber (121) to an engine;

a working chamber (91) located between said drive ring (74) and said driven ring (84); and a quantity of magnetorheological fluid within said working chamber (91), wherein said drive ring (74) is driven by a shearing of said quantity of magnetorheological fluid said driven ring (84); a working chamber (91) located between said drive ring (74) and said driven ring (84); and a quantity of magnetorheological fluid within said working chamber (91);" should be deleted [lines 12-44].